United States Patent [19]
Suganuma et al.

[11] Patent Number: 5,694,425
[45] Date of Patent: Dec. 2, 1997

[54] DIGITAL AUDIO SIGNAL TRANSMITTING APPARATUS

[75] Inventors: Toshiya Suganuma, Fujisawa; Takeshi Kawanobe; Toshiki Yagi, both of Yokohama, all of Japan

[73] Assignee: Matsushita Electric Industrial Co., Ltd., Osaka, Japan

[21] Appl. No.: 547,810

[22] Filed: Oct. 25, 1995

[30] Foreign Application Priority Data

Oct. 27, 1994 [JP] Japan .................... 6-263974

[51] Int. Cl.⁶ .................................................. H04B 1/66
[52] U.S. Cl. .................... 375/240; 375/242; 370/522; 395/2.91
[58] Field of Search ................................ 375/219, 242, 375/377, 240, 241; 379/281; 395/2, 2.21, 2.91; 341/51; 370/522

[56] References Cited

U.S. PATENT DOCUMENTS

| 4,254,304 | 3/1981 | Fulghum et al. | 379/281 |
| 5,177,480 | 1/1993 | Clark | 341/51 |
| 5,390,177 | 2/1995 | Nahumi | 370/62 |
| 5,430,800 | 7/1995 | Miura | 380/18 |
| 5,513,211 | 4/1996 | Yabusaki et al. | 375/219 |

Primary Examiner—Temesghen Ghebretinsae
Attorney, Agent, or Firm—Pollock, Vande Sande & Priddy

[57] ABSTRACT

An audio signal encoding device has a decoder for decoding a digital audio signal of a given code; a pseudo PCM signal generator for interposing the digital audio signal of the given code in a predetermined background signal; a first mode change switch for selecting one of an output signal of the decoder and an output signal of the pseudo PCM signal generator in response to a mode change signal; a pattern change switch for selecting one of a first bit pattern signal and a second bit pattern signal in response to first and second pattern change signals: and a bit pattern interposer for interposing a bit pattern signal selected by the pattern change switch in a signal selected by the first mode change switch. An audio signal compressing and encoding device has an encoder for compressing and encoding an incoming digital audio signal into another digital audio signal of the given code; a signal extractor for extracting a digital audio signal of the given code from the incoming digital audio signal; a first bit pattern detector for detecting whether or not the incoming digital audio signal contains the first bit pattern signal, and for generating the first pattern change signal in response to a result of said detecting; a second bit pattern detector for detecting whether or not the incoming digital audio signal contains the second bit pattern signal, and for generating the pattern change signal and the mode change signal in response to a result of said detecting: and a second mode change switch for selecting one of an output signal of the encoder and an output signal of the signal extractor in response to the mode change signal.

4 Claims, 6 Drawing Sheets

DIGITAL AUDIO SIGNAL TRANSMITTING APPARATUS

BACKGROUND OF THE INVENTION

1. Field of the Invention

This invention relates to a digital audio signal transmitting apparatus having the function of compressing an input digital audio signal.

2. Description of the Prior Art

In digital networks, highly efficient encoding and decoding processes on audio information (speech information) enable efficient utilization of transmission lines. In a typical case, a digital speech signal (a digital audio signal) resulting from highly efficient encoding is transmitted for communication via a long-distance line while a PCM speech signal (a PCM audio signal) is transmitted for communication via a short-distance line.

In some digital networks, two terminal stations can be connected to each other via a switching office. Some of the terminal stations include a highly efficient encoding device and a corresponding decoding device operating on audio information (speech information). Also, the switching office includes highly efficient encoding devices and corresponding decoding devices. During communication between terminal stations each has a highly efficient encoding device and a corresponding decoding device. Audio information passes through the highly efficient encoding device in the sender terminal station and the highly efficient encoding device in the switching office, and therefore undergoes the highly efficient encoding twice.

When audio information undergoes highly efficient encoding, the quality of the audio information is lowered by inevitable quantization distortion. To prevent such a reduction in the quality of audio information, an advanced prior-art switching office is designed to implement the following function. In communications between terminal stations having a highly efficient encoding device and a corresponding decoding device, the advanced prior-art switching office enables sender audio information to substantially bypass a highly efficient encoding device therein. However, the advanced prior-art switching office has a problem in that dial information can not be smoothly accepted under certain conditions.

SUMMARY OF THE INVENTION

It is an object of this invention to provide an improved digital audio signal transmitting apparatus for use in a switching office.

A first aspect of this invention provides a digital audio signal transmitting apparatus comprising a) an audio signal encoding device which includes a1) a decoder for decoding a digital audio signal of a given code back into an original digital audio signal; a2) a pseudo PCM signal generator for interposing the digital audio signal of the given code in a predetermined background PCM signal; a3) a first operation mode change switch for selecting an output signal of the decoder or an output signal of the pseudo PCM signal generator in response to an operation mode change signal; a4) a first bit pattern generator for generating a first bit pattern signal including bits in a first predetermined pattern; a5) a second bit pattern generator for generating a second bit pattern signal including bits in a second predetermined pattern different from the first predetermined pattern; a6) a bit pattern change switch for selecting the first bit pattern signal or the second bit pattern signal in response to first and second bit pattern change signals; a7) a bit pattern interposer for interposing a bit pattern signal selected by the bit pattern change switch in a signal selected by the first operation mode change switch; and b) an audio signal compressing and encoding device which includes b1) an encoder for compressing and encoding an incoming digital audio signal into another digital audio signal of the given code; b2) a signal extractor for extracting a digital audio signal of the given code from the incoming digital audio signal; b3) a first bit pattern detector for detecting whether or not the incoming digital audio signal contains the first bit pattern signal, and for generating the first bit pattern change signal in response to a result of said detecting; b4) a second bit pattern detector for detecting whether or not the incoming digital audio signal contains the second bit pattern signal, and for generating the second pattern change signal and the operation mode change signal in response to a result of said detecting; b5) a second operation mode change switch for selecting an output signal of the encoder or an output signal of the signal extractor in response to the operation mode change signal.

A second aspect of this invention provides a digital audio signal transmitting apparatus comprising a) an audio signal encoding device which includes a1) a decoder for decoding a digital audio signal of a given code back into an original digital audio signal; a2) a pseudo PCM signal generator for interposing the digital audio signal of the given code in a predetermined background PCM signal; a3) a first operation mode change switch for selecting an output signal of the decoder or an output signal of the pseudo PCM signal generator in response to an operation mode change signal; a4) a bit pattern adder for interposing a bit pattern signal in a signal selected by the first operation mode change switch, the bit pattern signal including bits in a predetermined pattern; and b) an audio signal compressing and encoding device which includes b1) an encoder for compressing and encoding an incoming digital audio signal into another digital audio signal of the given code; b2) a signal extractor for extracting a digital audio signal of the given code from the incoming digital audio signal; b3) a bit pattern detector for detecting whether or not the incoming digital audio signal contains the bit pattern signal, and for generating and outputting a signal in response to a result of said detecting; b4) a logic operation circuit for executing given logic operation among the output signal of the bit pattern detector, a sending signal, and a receiving signal, and for generating the operation mode change signal in response to the output signal of the bit pattern detector, the sending signal, and the receiving signal, wherein the sending signal and the receiving signal represent whether or not communication is currently executed: b5) a second operation mode change switch for selecting an output signal of the encoder or an output signal of the signal extractor in response to the operation mode change signal.

A third aspect of this invention is based on the second aspect thereof, and provides a digital audio signal transmitting apparatus wherein the logic operation circuit comprises an AND circuit.

A fourth aspect of this invention provides an apparatus connected to a transit switch and operating on an incoming digital audio signal sequentially representing dial information and audio information, the apparatus comprising an encoder; first means for continuously feeding an incoming digital audio signal to the encoder and transmitting an output signal of the encoder to the transit switch until the whole of dial information represented by the output signal of the encoder is received by the transit switch; and second means for enabling the incoming digital audio signal to bypass the encoder and travel directly to the transit switch after the whole of the dial information is received by the transit switch.

DESCRIPTION OF THE PREFERRED EMBODIMENTS

Prior-art systems will now be described for a better understanding of this invention.

Figure 1:
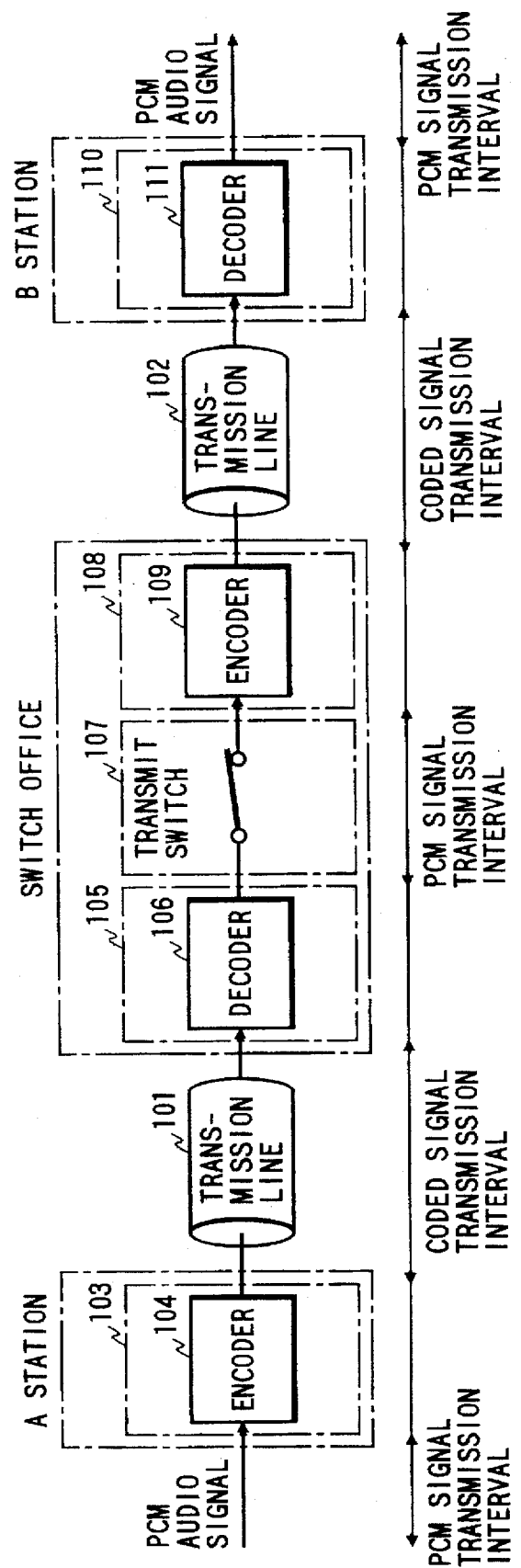
FIG. 1 is a diagram of a portion of a first prior-art digital network system.

FIG. 1 shows a portion of a prior-art digital network system which includes an "A" station (a terminal station or an exchange), a "B" station (a terminal station or an exchange), and a switching office. The "A" station and the switching office are connected by a transmission line 101. The "B" station and the switching office are connected by a transmission line 102.

In the prior-art digital network system of FIG. 1, the "A" station includes a digital audio signal transmitting apparatus 103 having an audio signal compressing and encoding device 104. The audio signal compressing and encoding device 104 is connected to the transmission line 101. The switching office includes a digital audio signal transmitting apparatus 105 having an audio signal decoding device 106. The audio signal decoding device 106 is connected to the transmission line 101. Also, the switching office includes a transit switch 107. Further, the switching office includes a digital audio signal transmitting apparatus 108 having an audio signal compressing and encoding device 109. The audio signal compressing and encoding device 109 is connected to the transmission line 102. The transit switch 107 is connected between the audio signal decoding device 106 and the audio signal compressing and encoding device 109. The "B" station includes a digital audio signal transmitting apparatus 110 having an audio signal decoding device 111. The audio signal decoding device 111 is connected to the transmission line 102.

It should be noted that other terminal stations (not shown) are connected to the switching office. Some of the other terminal stations have neither an audio signal compressing and encoding device nor a corresponding decoding device.

Under conditions where the "A" station, the switching office, and the "B" station are connected, the prior-art digital network system of FIG. 1 operates as follows. In the "A" station, a PCM audio signal representing sender audio information (sender speech information) is compressed and encoded into a second digital audio signal of a given code by the audio signal compressing and encoding device 104 in the digital audio signal transmitting apparatus 103. The second digital audio signal is transmitted from the audio signal compressing and encoding device 104 in the "A" station to the audio signal decoding device 106 in the digital audio signal transmitting apparatus 105 in the switching office via the transmission line 101. In the switching office, the second digital audio signal is decoded back into the original PCM audio signal by the audio signal decoding device 106. The transit switch 107 executes a switching process, and thereby transmits the PCM audio signal from the audio signal decoding device 106 to the audio signal compressing and encoding device 109 in the audio signal transmitting apparatus 108. The PCM audio signal is compressed and encoded into another digital audio signal of the given code by the audio signal compressing and encoding device 109. The digital audio signal of the given code is transmitted from the audio signal compressing and encoding device 109 in the switching office to the audio signal decoding device 111 in the digital audio signal transmitting apparatus 110 in the "B" station via the transmission line 102. In the "B" station, the digital audio signal of the given code is decoded back into the original PCM audio signal by the audio signal decoding device 111. The PCM audio signal is outputted from the audio signal decoding device 111.

In this way, the sender audio information passes through the audio signal compressing and encoding device 104 in the "A" station and the audio signal compressing and encoding device 109 in the switching office, and therefore undergoes an encoding process twice. The quality of the sender audio information tends to be considerably lowered as the sender audio information undergoes the encoding process twice.

Figure 2:
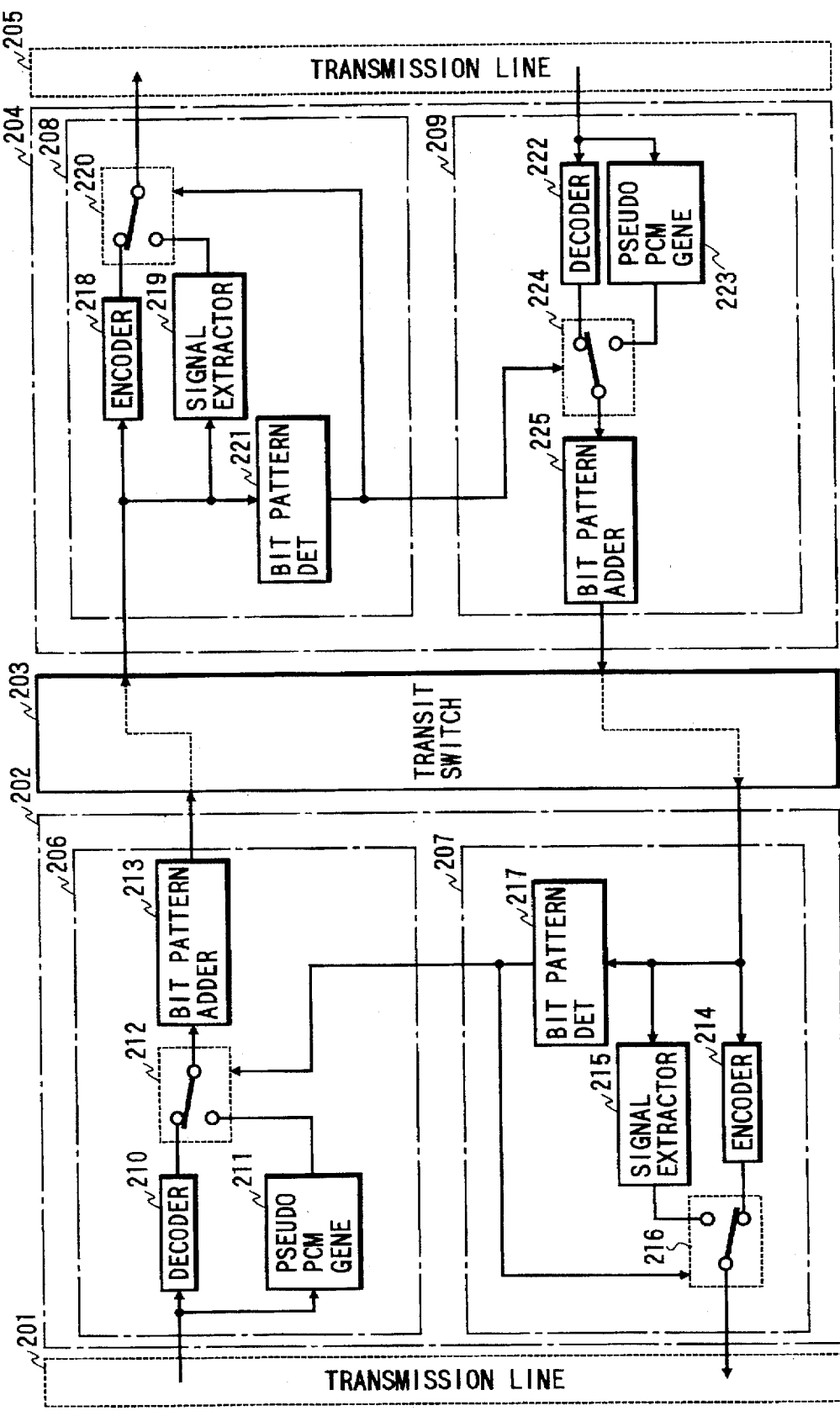
FIG. 2 is a diagram of a portion of a second prior-art digital network system.

FIG. 2 shows a portion of another prior-art digital network system which includes a transmission line 201, a digital audio signal transmitting apparatus 202, a transit switch 203, a digital audio signal transmitting apparatus 204, and a transmission line 205. The digital audio signal transmitting apparatuses 202 and 204 and the transit switch 203 are provided in a switching office. The digital audio signal transmitting apparatus 202 is connected to a digital-type station (not shown) via the transmission line 201. The digital audio signal transmitting apparatus 204 is connected to a digital-type station (not shown) via the transmission line 205.

The digital audio signal transmitting apparatus 202 includes an audio signal decoding device 206 and an audio signal compressing and encoding device 207 which are connected between the transmission line 201 and the transit switch 203. The digital audio signal transmitting apparatus 204 includes an audio signal compressing and encoding device 208 and an audio signal decoding device 209 which are connected between the transit switch 203 and the transmission line 205.

The audio signal decoding device 206 includes a decoder 210, a pseudo PCM signal generator 211, an operation mode change switch 212, and a bit pattern adder 213. The input terminals of the decoder 210 and the pseudo PCM signal generator 211 are connected to the transmission line 20 1. The output terminals of the decoder 2 10 and the pseudo PCM signal generator 211 are connected to the operation mode change switch 212. The operation mode change switch 212 is connected to the input terminal of the bit pattern adder 213. The output terminal of the bit pattern adder 213 is connected to the transit switch 203.

The audio signal compressing and encoding device 207 includes an encoder 214, a signal extractor 215, an operation mode change switch 216, and a bit pattern detector 217. The input terminals of the encoder 214, the signal extractor 215, and the bit pattern detector 217 are connected to the transit switch 203. The output terminals of the encoder 214 and the signal extractor 215 are connected to the operation mode change switch 216. The operation mode change switch 216 is connected to the transmission line 201. The output terminal of the bit pattern detector 217 is connected to a control terminal of the operation mode change switch 216 and also a control terminal of the operation mode change switch 212 in the audio signal decoding device 206.

The audio signal compressing and encoding device 208 includes an encoder 218, a signal extractor 219, an operation mode change switch 220, and a bit pattern detector 221. The input terminals of the encoder 218, the signal extractor 219, and the bit pattern detector 221 are connected to the transit switch 203. The output terminals of the encoder 218 and the signal extractor 219 are connected to the operation mode change switch 220. The operation mode change switch 220 is connected to the transmission line 205. The output terminal of the bit pattern detector 22 1 is connected to a control terminal of the operation mode change switch 220.

The audio signal decoding device 209 includes a decoder 222, a pseudo PCM signal generator 223, an operation mode change switch 224, and a bit pattern adder 225. The input terminals of the decoder 222 and the pseudo PCM signal generator 223 are connected to the transmission line 205. The output terminals of the decoder 222 and the pseudo PCM signal generator 223 are connected to the operation mode change switch 224. The operation mode change switch 224 is connected to the input terminal of the bit pattern adder 225. The output terminal of the bit pattern adder 225 is connected to the transit switch 203. The operation mode change switch 224 has a control terminal connected to the output terminal of the bit pattern detector 221 in the audio signal compressing and encoding device 208.

It should be noted that terminal stations such as ordinary telephone sets other than digital-type stations are also connected to the transit switch 203.

The prior-art digital network system of FIG. 2 operates as follows. Operation of the audio signal decoding device 206 and operation of the audio signal decoding device 209 are similar to each other. Thus, only the operation of the audio signal decoding device 206 will be described in detail. The decoder 210 and the pseudo PCM signal generator 211 in the audio signal decoding device 206 receive an input audio signal (an input speech signal) from the transmission line 201. When the input audio signal agrees with a digital audio signal of a given code, the decoder 210 converts the digital audio signal of the given code back into an original PCM audio signal (a true PCM audio signal) through a decoding process. The decoder 210 outputs the true PCM audio signal to the operation mode change switch 212. On the other had, the pseudo PCM signal generator 211 adds meaningless data to the digital audio signal of the given code and thereby converts the digital audio signal of the given code into a pseudo PCM signal without executing an effective decoding process. The pseudo PCM signal generator 211 outputs the pseudo PCM signal to the operation mode change switch 212. The operation mode change switch 212 selects the true PCM audio signal or the pseudo PCM signal, and transmits the selected signal to the bit pattern adder 213. The bit pattern adder 213 interposes or adds bits of a given pattern into the digital signal selected by the operation mode change switch 212. The bit pattern adder 213 outputs the resultant digital signal to the transit switch 203. Accordingly, a digital signal applied to the transit switch 203, which originates from sender audio information (sender speech information) generated by a digital-type station, contains the given-pattern bits. On the other hand, a digital signal applied to the transit switch 203, which originates from sender audio information (sender speech information) generated by an ordinary telephone set, does not contain the given-pattern bits.

The transit switch 203 executes a switching process, and thereby transmits the digital signal from the audio signal decoding device 206 to a destination (a communication opposite party).

Operation of the audio signal compressing and encoding device 207 and operation of the audio signal compressing and encoding device 208 are similar to each other. Thus, only the operation of the audio signal compressing and decoding device 207 will be described in detail. The encoder 214, the signal extractor 215, and the bit pattern detector 217 in the audio signal compressing and encoding device 207 receive a digital signal from the transit switch 203. The encoder 214 converts the received digital signal into a corresponding digital signal of the given code through compressing and encoding processes. Operation of the encoder 214 is inverse with respect to operation of the decoder 210 in the audio signal decoding device 206. The encoder 214 outputs the digital signal of the given code to the operation mode change switch 216. The signal extractor 215 deletes a part of the received digital signal and thereby converts the received digital signal into a digital audio signal of the given code without executing an effective encoding process. Operation of the signal extractor 215 is inverse with respect to operation of the pseudo PCM signal generator 211 in the audio signal decoding device 206. The signal extractor 215 outputs the digital audio signal of the given code to the operation mode change switch 216. The operation mode change switch 216 selects one of the output signals of the encoder 214 and the signal extractor 215, and transmits the selected signal to the transmission line 201.

The bit pattern detector 217 in the audio signal compressing and encoding device 207 decides whether or not the received digital signal contains the given-pattern bits, and generates a switch control signal in response to the result of the decision. The bit pattern detector 217 outputs the switch control signal to both the operation mode change switch 212 in the audio signal decoding device 206 and the operation mode change switch 216 in the audio signal compressing and encoding device 207. When the bit pattern detector 217 detects that the received digital signal contains the given-pattern bits, the operation mode change switch 212 selects the output signal of the pseudo PCM signal generator 211 in response to the switch control signal. In addition, the operation mode change switch 216 selects the output signal of the signal extractor 215. On the other hand, when the bit pattern detector 217 detects that the received digital signal does not contain the given-pattern bits, the operation mode change switch 212 selects the output signal of the decoder 210. In addition, the operation mode change switch 216 selects the output signal of the encoder 214.

Accordingly, in the case where the communication opposite party agrees with a digital-type station, transmitted audio information is enabled to bypass the decoder 210 and the encoder 214 in the digital audio signal transmitting apparatus 202. On the other hand, in the case where the communication opposite party agrees with an ordinary telephone set, transmitted audio information is enabled to travel through the decoder 210 and the encoder 214. Thus, in this case, the decoder 210 and the encoder 214 are actually used and operated.

In the case where the transit switch 203 is of a given type, the digital audio signal transmitting apparatuses 202 and 204 in the prior-art digital network system of FIG. 2 have a problem in that only one-way connection tends to be established at an initial stage of a process of connecting two digital-type terminal stations. Dial information is sometimes represented by a non-speech signal such as an MF tone signal. It is now assumed that the digital audio signal transmitting apparatus 202 relates to a calling party while the digital audio signal transmitting apparatus 204 relates to a called party. A digital audio signal of the given code which indicates the non-speech dial information is decoded back into an original PCM audio signal by the decoder 210, and then the PCM audio signal is fed via the bit pattern adder 213 to the transit switch 203. Thus, the transit switch 203 executes a connecting process or a switching process in response to the PCM dial signal. The transit switch 203 of the given type is designed to operate as follows. Upon the reception of a first portion of dial information from a calling party, the transit switch 203 establishes only one-way connection from the calling party to a called party or one-way connection from the called party to the calling party. When the remainder of the dial information has been received, the transit switch 203 establishes two-way connection between the calling party and the called party. In the case where only one-way connection from the called party to the calling party is established, a signal received by the bit pattern detector 217 from the transit switch 203 contains the given-pattern bits. Thus, the operation mode change switch 212 selects the output signal of the pseudo PCM signal generator 211 instead of the output signal of the decoder 210. In addition, the operation mode change switch 216 selects the output signal of the signal extractor 215 instead of the output signal of the encoder 214. Since one-way connection from the calling party to the called party is absent, a signal received by the bit pattern detector 221 from the transit switch 203 does not have the given-pattern bits. Thus, the operation mode change switch 220 selects the output signal of the encoder 218. In addition, the operation mode change switch 224 selects the output signal of the decoder 222.

As previously described, during the transmission of dial information from the calling party, the mode change switch 212 first selects the output signal of the decoder 210 and then selects the output signal of the pseudo PCM signal generator 211. Since the transit switch 203 does not accurately recover the dial information from the output signal of the pseudo PCM signal generator 211, the transit switch 203 fails to detect a latter portion of the dial information. Accordingly, the transit switch 203 does not establish two-way connection between the calling party and the called party.

First Embodiment

Figure 3:
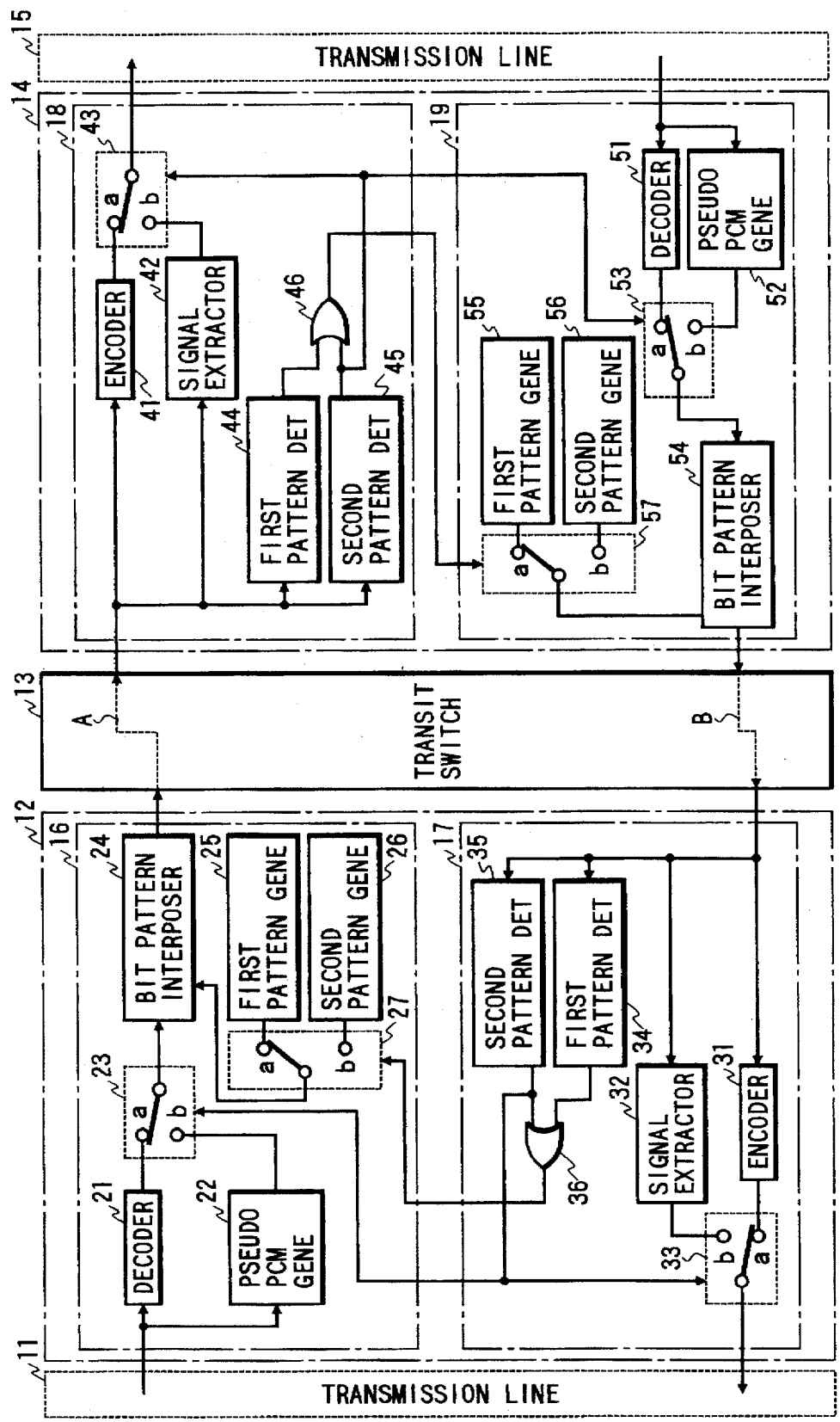
FIG. 3 is a diagram of a portion of a digital network system according to a first embodiment of this invention.

FIG. 3 shows a portion of a digital network system which includes a transmission line 11, a digital audio signal transmitting apparatus 12, a transit switch 13, a digital audio signal transmitting apparatus 14, and a transmission line 15. The digital audio signal transmitting apparatuses 12 and 14 and the transit switch 13 are prodded in a switching office. The digital audio signal transmitting apparatus 12 is connected to a digital-type station (not shown) via the transmission line 11. The digital audio signal transmitting apparatus 14 is connected to a digital-type station (not shown) via the transmission line 15.

The digital audio signal transmitting apparatus 12 includes an audio signal decoding device 16 and an audio signal compressing and encoding device 17 which are connected between the transmission line 11 and the transit switch 13. The digital audio signal transmitting apparatus 14 includes an audio signal compressing and encoding device 18 and an audio signal decoding device 19 which are connected between the transit switch 13 and the transmission line 15.

The audio signal decoding device 16 includes a decoder 21, a pseudo PCM signal generator 22, an operation mode change switch 23, and a bit pattern adder (no reference numeral). The bit pattern adder includes a bit pattern interposer 24, a first bit pattern generator 25, a second bit pattern generator 26, and a bit pattern change switch 27. The input terminals of the decoder 21 and the pseudo PCM signal generator 22 are connected to the transmission line 11. The output terminals of the decoder 21 and the pseudo PCM signal generator 22 are connected to the operation mode change switch 23. The operation mode change switch 23 is connected to a first input terminal of the bit pattern interposer 24. The output terminals of the first and second bit pattern generators 25 and 26 are connected to the bit pattern change switch 27. The bit pattern change switch 27 is connected to a second input terminal of the bit pattern interposer 24. The output terminal of the bit pattern interposer 24 is connected to the transit switch 13.

The audio signal compressing and encoding device 17 includes an encoder 31, a signal extractor 32, an operation mode change switch 33, a first bit pattern detector 34, a second bit pattern detector 35, and an OR circuit 36. The input terminals of the encoder 31, the signal extractor 32, the first bit pattern detector 34, and the second bit pattern detector 35 are connected to the transit switch 13. The output terminals of the encoder 31 and the signal extractor 32 are connected to the operation mode change switch 33. The operation mode change switch 33 is connected to the transmission line 11. The output terminal of the first bit pattern detector 34 is connected to a first input terminal of the OR circuit 36. The output terminal of the second bit pattern detector 35 is connected to a second input terminal of the OR circuit 36. In addition, the output terminal of the second bit pattern detector 35 is connected to a control terminal of the operation mode change switch 33 and also a control terminal of the operation mode change switch 23 in the audio signal decoding device 16. The output terminal of the OR circuit 36 is connected to a control terminal of the bit pattern change switch 27 in the audio signal decoding device 16.

The audio signal compressing and encoding device 18 includes an encoder 41, a signal extractor 42, an operation mode change switch 43, a first bit pattern detector 44, a second bit pattern detector 45, and an OR circuit 46. The input terminals of the encoder 41, the signal extractor 42, the first bit pattern detector 44, and the second bit pattern detector 45 are connected to the transit switch 13. The output terminals of the encoder 41 and the signal extractor 42 are connected to the operation mode change switch 43. The operation mode change switch 43 is connected to the transmission line 15. The output terminal of the first bit pattern detector 44 is connected to a first input terminal of the OR circuit 46. The output terminal of the second bit pattern detector 45 is connected to a second input terminal of the OR circuit 46. In addition, the output terminal of the second bit pattern detector 45 is connected to a control terminal of the operation mode change switch 43.

The audio signal decoding device 19 includes a decoder 51, a pseudo PCM signal generator 52, an operation mode change switch 53, and a bit pattern adder (no reference numeral). The bit pattern adder includes a bit pattern interposer 54, a first bit pattern generator 55, a second bit pattern generator 56, and a bit pattern change switch 57. The input terminals of the decoder 51 and the pseudo PCM signal generator 52 are connected to the transmission line 15. The output terminals of the decoder 51 and the pseudo PCM signal generator 52 are connected to the operation mode change switch 53. The operation mode change switch 53 is connected to a first input terminal of the bit pattern interposer 54. A control terminal of the operation mode change switch 53 is connected to the output terminal of the second bit pattern detector 45 in the audio signal compressing and encoding device 18. The output terminals of the first and second bit pattern generators 55 and 56 are connected to the bit pattern change switch 57. The bit pattern change switch 57 is connected to a second input terminal of the bit pattern interposer 54. A control terminal of the bit pattern change switch 57 is connected to the output terminal of the OR circuit 46 in the audio signal compressing and encoding device 18. The output terminal of the bit pattern interposer 54 is connected to the transit switch 13.

It should be noted that stations such as ordinary telephone sets other than digital-type stations are also connected to the transit switch 13.

The digital network system of FIG. 3 operates as follows. Operation of the audio signal decoding device 16 and operation of the audio signal decoding device 19 are similar to each other. Thus, only the operation of the audio signal decoding device 16 will be described in detail. The decoder 21 and the pseudo PCM signal generator 22 in the audio signal decoding device 16 receive an input audio signal (an input speech signal) from the transmission line 11. When the input audio signal agrees with a digital audio signal of a given code, the decoder 21 converts the digital audio signal of the given code back into an original PCM audio signal (a true PCM audio signal) through a decoding process. The decoder 21 outputs the true PCM audio signal to the operation mode change switch 23. On the other hand, the pseudo PCM signal generator 22 adds meaningless data to the digital audio signal of the given code and thereby converts the digital audio signal of the given code into a pseudo PCM signal without executing an effective decoding process. Specifically, the pseudo PCM signal generator 22 places bits of the digital audio signal of the given code in predetermined bit positions in the PCM signal format respectively, and places fixed-value bits in other bit positions in the PCM signal format. The pseudo PCM signal generator 22 outputs the pseudo PCM signal to the operation mode change switch 23. The operation mode change switch 23 selects one of the true PCM audio signal and the pseudo PCM signal, and transmits the selected signal to the bit pattern interposer 24. The first bit pattern generator 25 outputs a signal composed of bits of a first predetermined pattern to the bit pattern change switch 27. The second bit pattern generator 26 outputs a signal composed of bits of a second predetermined pattern to the bit pattern change switch 27. The first and second predetermined patterns are different from each other. The bit pattern change switch 27 selects one of the first bit pattern signal and the second bit pattern signal, and outputs the selected bit pattern signal to the bit pattern interposer 24. The bit pattern interposer 24 includes a signal selector, interposing or adding bits of a given pattern (the first predetermined pattern or the second predetermined pattern), which is represented by the output signal of the bit pattern change switch 27, into the digital signal selected by the operation mode change switch 23. The bit pattern interposer 24 outputs the resultant digital signal to the transit switch 13. Accordingly, a digital signal applied to the transit switch 13, which originates from sender audio information (sender speech information) generated by a digital-type station, contains the first-pattern bits or the second-pattern bits. On the other hand, a digital signal applied to the transit switch 13, which originates from sender audio information (sender speech information) generated by an ordinary telephone set, contains neither the first-pattern bits nor the second-pattern bits.

The transit switch 13 executes a switching process, and thereby transmits the digital signal from the audio signal decoding device 16 to a destination (a communication opposite party).

Operation of the audio signal compressing and encoding device 17 and operation of the audio signal compressing and encoding device 19 are similar to each other. Thus, only the operation of the audio signal compressing and decoding device 17 will be described in detail. The encoder 31, the signal extractor 32, the first bit pattern detector 34, and the second bit pattern detector 35 in the audio signal compressing and encoding device 17 receive a digital signal from the transit switch 13. The encoder 31 converts the received digital signal into a corresponding digital signal of the given code through compressing and encoding processes. Operation of the encoder 31 is inverse with respect to operation of the decoder 21 in the audio signal decoding device 16. The encoder 31 outputs the digital signal of the given code to the operation mode change switch 33. The signal extractor 32 deletes a part of the received digital signal and thereby converts the received digital signal into a digital audio signal of the given code without executing an effective encoding process. Operation of the signal extractor 32 is inverse with respect to operation of the pseudo PCM signal generator 22 in the audio signal decoding device 16. The signal extractor 32 outputs the digital audio signal of the given code to the operation mode change switch 33. The operation mode change switch 33 selects one of the output signals of the encoder 31 and the signal extractor 32, and transmits the selected signal to the transmission line 11.

The first bit pattern detector 34 in the audio signal compressing and encoding device 17 decides whether or not the received digital signal contains the first-pattern bits, and generates a signal representing the result of the decision. The first bit pattern detector 34 outputs the generated signal to the OR circuit 36. The second bit pattern detector 35 in the audio signal compressing and encoding device 17 decides whether or not the received digital signal contains the second-pattern bits, and generates a switch control signal in response to the result of the decision. The second bit pattern detector 35 outputs the switch control signal to both the operation mode change switch 23 in the audio signal decoding device 16 and the operation mode change switch 33 in the audio signal compressing and encoding device 17. When the second bit pattern detector 35 detects that the received digital signal contains the second-pattern bits, the operation mode change switch 23 selects the output signal of the pseudo PCM signal generator 22 in response to the switch control signal. In addition, the operation mode change switch 33 selects the output signal of the signal extractor 32. On the other hand, when the second bit pattern detector 35 detects that the received digital signal does not contain the second-pattern bits, the operation mode change switch 23 selects the output signal of the decoder 21. In addition, the operation mode change switch 33 selects the output signal of the encoder 31.

The output signal (the switch control signal) of the second bit pattern detector 35 is also applied to the OR circuit 36. The OR circuit 36 executes logic OR operation between the output signals of the first and second bit pattern detectors 34 and 35. The output signal of the OR circuit 36 is fed to the pattern change switch 27 in the audio signal decoding device 16 as a switch control signal. The bit pattern change switch 27 selects one of the first bit pattern signal and the second bit pattern signal in response to the switch control signal, and outputs the selected bit pattern signal to the bit pattern interposer 24. When at least one of the first and second bit pattern detectors 34 and 35 detects the related bit pattern in the received digital signal, the pattern change switch 27 selects the second bit pattern signal in response to the switch control signal. On the other hand, when none of the first and second bit pattern detectors 34 and 35 detects the related bit pattern in the received digital signal, the pattern change switch 27 selects the first bit pattern signal in response to the switch control signal.

In the case where the communication opposite party agrees with a digital-type station, transmitted audio information is enable to bypass the decoder 21 and the encoder 31 in the digital audio signal transmitting apparatus 12. On the other hand, in the case where the communication opposite party agrees with an ordinary telephone set, transmitted audio information is enabled to travel through the decoder 21 and the encoder 31. Thus, in this case, the decoder 21 and the encoder 31 are actually used and operated.

Figure 4:
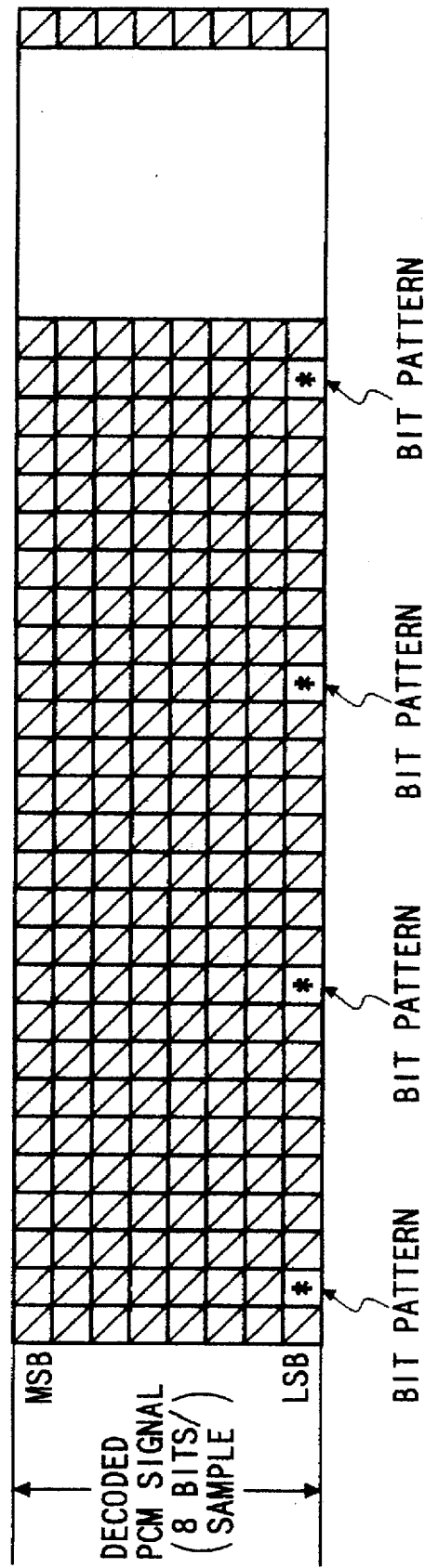
FIG. 4 is a diagram of a format of the output signal of a bit pattern interposer which occurs when a decoder is selected and used in a digital audio signal transmitting apparatus in the system of FIG. 3.

Operation of the digital network system of FIG. 3 will be further described. In the case where the digital audio signal transmitting apparatus 12 is connected via the transit switch 13 to an ordinary telephone set or is in an unconnected state, a digital signal received by the audio signal compressing and encoding device 17 from the transit switch 13 contains neither the first-pattern bits nor the second-pattern bits. Accordingly, the operation mode change switch 23 selects the output signal of the decoder 21 while the operation mode change switch 33 selects the output signal of the encoder 31. Further, the operation mode change switch 23 selects the first bit pattern signal. In this case, a digital audio signal of the given code which is fed from the transmission line 11 is decoded back into an original PCM audio signal (a true PCM audio signal) by the decoder 21. The true PCM audio signal is transmitted from the decoder 21 to the bit pattern interposer 24 via the operation mode change switch 23. The device 24 interposes or adds the first bit pattern signal in the true PCM audio signal. The bit pattern interposer 24 outputs the resultant digital signal to the transit switch 13. Specifically, the bit pattern interposer 24 places bits of the first bit pattern signal in predetermined bit positions in the true PCM audio signal respectively. In more detail, the bit pattern interposer 24 replaces the predetermined-position bits of the true PCM audio signal by the bits of the first bit pattern signal respectively. Preferably, the predetermined bit positions correspond to a given period. The predetermined bit positions and the related period are preferably chosen so that the interposition of the first bit pattern signal in the true PCM audio signal will not adversely affect the quality of audio information represented by the resultant digital signal. FIG. 4 shows one example of the manner of the interposition of the first bit pattern signal in the true PCM audio signal. In FIG. 4, bits of the first bit pattern signal are placed in the lowest bit positions (the LSB positions) of 8-bit data blocks spaced by equal intervals, respectively. On the other hand, a PCM audio signal received from the transit switch 13 is encoded into a corresponding digital audio signal of the given code by the encoder 31. The digital audio signal of the given code is transmitted from the encoder 31 to the transmission line 11 via the operation mode change switch 33.

A description will now be given of the case where two digital-type stations start to be connected via the transit switch 13. It is now assumed that the digital audio signal transmitting apparatus 12 relates to a calling party while the digital audio signal transmitting apparatus 14 relates to a called party. A digital audio signal of the given code which indicates non-speech dial information (for example, MF tone dial information) is decoded back into an original PCM audio signal by the decoder 21 before being transmitted to the transit switch 13 via the operation mode change switch 23 and the bit pattern interposer 24. Thus, the transit switch 13 executes a connecting process or a switching process in response to the PCM dial signal. In the case where the transit switch 13 establishes only one-way connection from the called party to the calling party via a speech path "B" upon the reception of a first portion of the dial information from the calling party, a digital signal transmitted from the audio signal decoding device 19 to the audio signal compressing and encoding device 17 via the speech path "B" in the transit switch 13 contains the first-pattern bits but does not contain the second-pattern bits. Therefore, the first bit pattern detector 34 detects the first bit pattern signal in the received signal, and the pattern change switch 27 selects the second bit pattern signal instead of the first bit pattern signal. At this state, the operation mode selection switch 23 remains selecting the output signal of the decoder 21 while the operation mode change switch 33 remains selecting the output signal of the encoder 31. Accordingly, the true PCM audio signal representing the remainder portion of the dial information is transmitted from the decoder 21 to the transit switch 13 via the operation mode change switch 23 and the bit pattern interposer 24. Generally, the transit switch 13 can accurately recover dial information from a PCM audio signal. Thus, the remainder portion of the dial information is received and recovered by the transit switch 13. After the remainder of the dial information is recovered by the transit switch 13 and then the whole of the dial information is transmitted to the called party from the transit switch 13, the transit switch 13 establishes one-way connection from the calling party to the called party via a speech path "A" in addition to one-way connection from the called party to the calling party via the speech path "B". A digital signal transmitted from the audio signal decoding device 16 to the audio signal compressing and encoding device 18 via the speech path "A" in the transit switch 13 contains the second-pattern bits. Therefore, the second bit pattern detector 45 detects the second bit pattern signal in the received signal, and the pattern change switch 57 selects the second bit pattern signal instead of the first bit pattern signal. In addition, the operation mode change switch 43 selects the output signal of the signal extractor 42 instead of the output signal of the encoder 41 while the operation mode change switch 53 selects the output signal of the pseudo PCM signal generator 52 instead of the output signal of the decoder 51. A digital signal transmitted from the audio signal decoding device 19 to the audio signal compressing and encoding device 17 via the speech path "B" in the transit switch 13 now contains the second-pattern bits. Therefore, the second bit pattern detector 35 detects the second bit pattern signal in the received signal, and the operation mode change switch 33 selects the output signal of the signal extractor 32 instead of the output signal of the encoder 31, while the operation mode change switch 23 selects the output signal of the pseudo PCM signal generator 22 instead of the output signal of the decoder 21. In this way, two-way connection between the calling party and the called party is established, and transmitted audio information is enabled to bypass the decoders 21 and 51 and the encoders 31 and 41 in the digital audio signal transmitting apparatuses 12 and 14.

Figure 5:
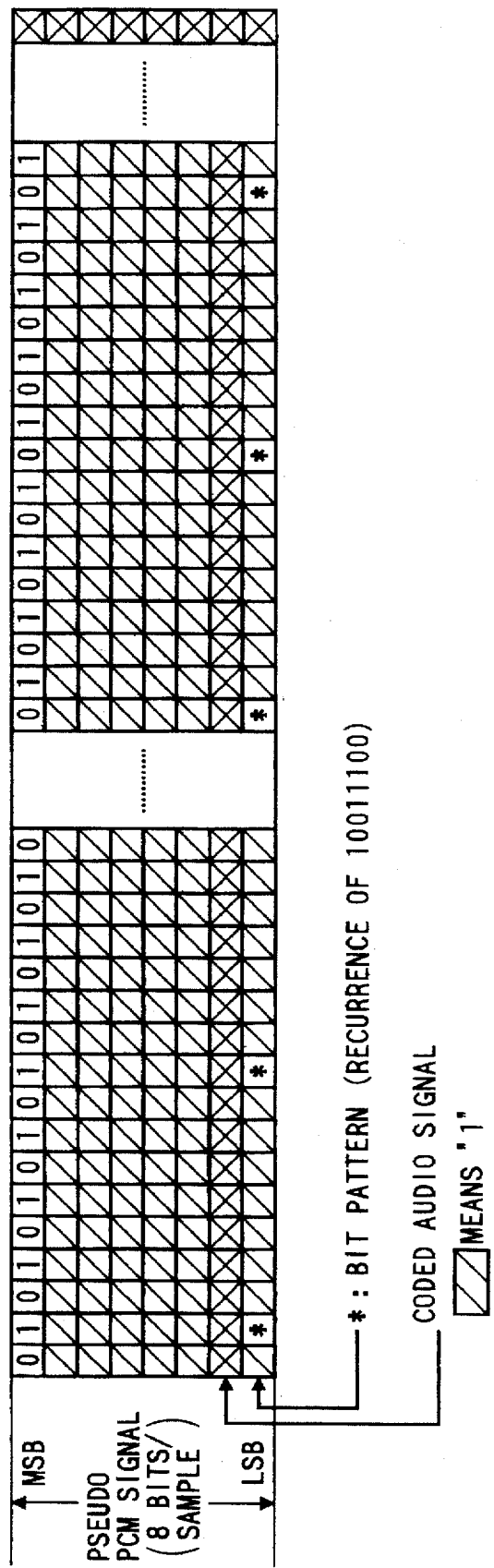
FIG. 5 is a diagram of a format of the output signal of the bit pattern interposer which occurs when a pseudo PCM signal generator is selected and used in the digital audio signal transmitting apparatus in the system of FIG. 3.

During two-way connection between the calling party and the called party, the digital audio signal transmitting apparatus 12 operates as follows. A digital audio signal of the given code which is fed from the transmission line 11 is convened into a pseudo PCM signal by the pseudo PCM signal generator 22. Specifically, the pseudo PCM signal generator 22 places bits of the digital audio signal of the given code in predetermined bit positions in the PCM signal format respectively, and places fixed-value bits in other bit positions in the PCM signal format. To generate the pseudo PCM signal, the pseudo PCM signal generator 22 may place bits of the digital audio signal of the given code in predetermined bit positions in a fixed meaningless background PCM signal respectively. The pseudo PCM signal is fed from the pseudo PCM signal generator 22 to the bit pattern interposer 24 via the operation mode change switch 23. The second bit pattern signal is fed from the second bit pattern generator 26 to the bit pattern interposer 24 via the pattern-change switch 27. The device 24 interposes or adds the second bit pattern signal in the pseudo PCM signal. The bit pattern interposer 24 outputs the resultant digital signal to the transit switch 13. Specifically, the bit pattern interposer 24 places bits of the second bit pattern signal in predetermined bit positions in the pseudo PCM signal respectively. In more detail, the bit pattern interposer 24 replaces the predetermined-position bits of the pseudo PCM signal by the bits of the second bit pattern signal respectively. Preferably, the predetermined bit positions correspond to a given period. The number of second-pattern bits interposed in the pseudo PCM signal during a unit time is preferably predetermined in accordance with the bit rate of a digital audio signal of the given code. FIG. 5 shows one example of the manner of combining the digital audio signal of the given code and the background PCM signal and the manner of the interposition of the second bit pattern signal in the pseudo PCM signal. In FIG. 5, bits of the digital audio signal of the given code (having a bit rate of 8 kbps) are placed in the second lowest bit positions in successive 8-bit data blocks of the background PCM signal (having a bit rate of 64 kbps) respectively. Further, bits of the second bit pattern signal are placed in the lowest bit positions (LSB positions) of 8-bit data blocks spaced by equal intervals, respectively. On the other hand, the signal extractor 32 deletes a part of a received digital signal transmitted via the transit switch 13, and thereby converts the received digital signal into a digital audio signal of the given code without executing an effective encoding process. In other words, the device 32 extracts the digital audio signal of the given code from the received digital signal. The digital audio signal of the given code is transmitted from the signal extractor 32 to the transmission line 11 via the operation mode change switch 33.

During two-way connection between the calling party and the called party, operation of the digital audio signal transmitting apparatus 14 is similar to the previously-mentioned operation of the digital audio signal transmitting apparatus 12.

When communication between the calling party and the called party ends, the transit switch 13 breaks the speech paths "A" and "B" so that the calling party and the called party are disconnected from each other. Then, the second-pattern bits disappear from the digital signal received by the second bit pattern detector 35. Therefore, the operation mode change switch 23 selects the output signal of the decoder 21 instead of the output signal of the pseudo PCM signal while the operation mode change switch 33 selects the output signal of the encoder 31 instead of the output signal of the signal extractor 32. In addition, the bit pattern change switch 27 selects the first bit pattern signal instead of the second bit pattern signal. These conditions of the operation mode change switches 23 and 33 and the bit pattern change switch 27 correspond to a stand-by state of the digital audio signal transmitting apparatus 12. Similarly, the digital audio signal transmitting apparatus 14 falls into a stand-by state.

Second Embodiment

Figure 6:
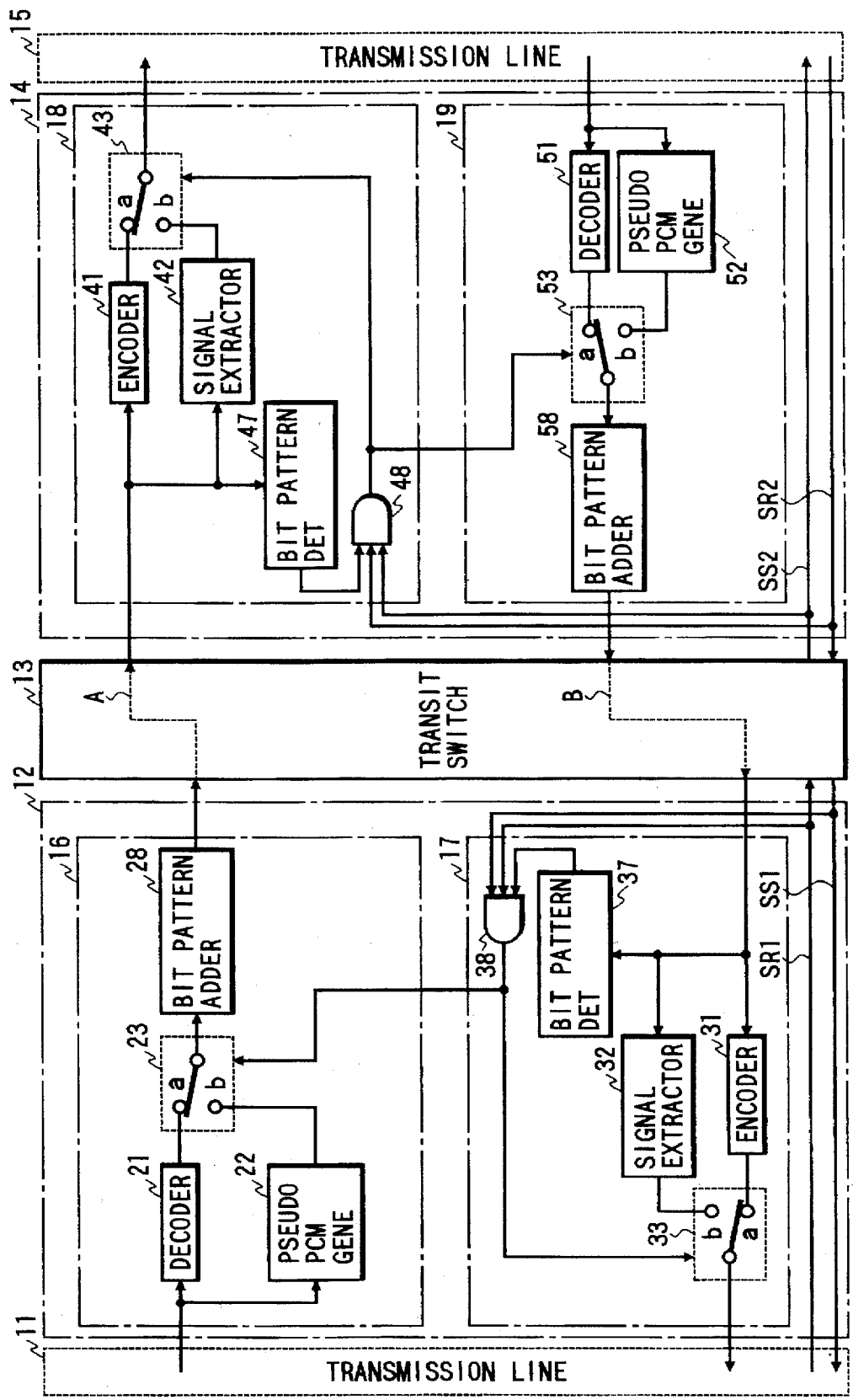
FIG. 6 is a diagram of a portion of a digital network system according to a second embodiment of this invention.

FIG. 6 shows a portion of a digital network system which includes a transmission line 11, a digital audio signal transmitting apparatus 12A, a transit switch 13, a digital audio signal transmitting apparatus 14A, and a transmission line 15. The digital audio signal transmitting apparatuses 12A and 14A and the transit switch 13 are provided in a switching office. The digital audio signal transmitting apparatus 12A is connected to a digital-type station (not shown) via the transmission line 11. The digital audio signal transmitting apparatus 14A is connected to a digital-type station (not shown) via the transmission line 15.

The digital audio signal transmitting apparatus 12A includes an audio signal decoding device 16A and an audio signal compressing and encoding device 17A which are connected between the transmission line 11 and the transit switch 13. The digital audio signal transmitting apparatus 12A also includes a pair of signaling bit lines SR1 and SS1 connected between the transmission line 11 and the transit switch 13. The digital audio signal transmitting apparatus 14A includes an audio signal compressing and encoding device 18A and an audio signal decoding device 19A which are connected between the transit switch 13 and the transmission line 15. The digital audio signal transmitting apparatus 14A also includes a pair of signaling bit lines SR2 and SS2 connected between the transmission line 15 and the transit switch 13.

The audio signal decoding device 16A includes a decoder 21, a pseudo PCM signal generator 22, an operation mode change switch 23, and a bit pattern adder 28. The input terminals of the decoder 21 and the pseudo PCM signal generator 22 are connected to the transmission line 11. The output terminals of the decoder 21 and the pseudo PCM signal generator 22 are connected to the operation mode change switch 23. The operation mode change switch 23 is connected to the input terminal of the bit pattern adder 28. The output terminal of the bit pattern adder 28 is connected to the transit switch 13.

The audio signal compressing and encoding device 17A includes an encoder 31, a signal extractor 32, an operation mode change switch 33, a bit pattern detector 37, and an AND circuit 38. The input terminals of the encoder 31, the signal extractor 32, and the bit pattern detector 37 are connected to the transit switch 13. The output terminals of the encoder 32 and the signal extractor 32 are connected to the operation mode change switch 33. The operation mode change switch 33 is connected to the transmission line 11. The output terminal of the bit pattern detector 37 is connected to a first input terminal of the AND circuit 38. Second and third input terminals of the AND circuit 38 are connected to the signaling bit lines SR1 and SS1 respectively. The output terminal of the AND circuit 38 is connected to a control terminal of the operation mode change switch 33 and also a control terminal of the operation mode change switch 23 in the audio signal decoding device 16A.

The audio signal compressing and encoding device 18A includes an encoder 41, a signal extractor 42, an operation mode change switch 43, a bit pattern detector 47, and an AND circuit 48. The input terminals of the encoder 41, the signal extractor 42, and the bit pattern detector 47 are connected to the transit switch 13. The output terminals of the encoder 41 and the signal extractor 42 are connected to the operation mode change switch 43. The operation mode change switch 43 is connected to the transmission line 15. The output terminal of the bit pattern detector 47 is connected to a first input terminal of the AND circuit 48. Second and third input terminals of the AND circuit 48 are connected to the signaling bit lines SR2 and SS2 respectively. The output terminal of the AND circuit 48 is connected to a control terminal of the operation mode change switch 43.

The audio signal decoding device 19A includes a decoder 51, a pseudo PCM signal generator 52, an operation mode change switch 53, and a bit pattern adder 58. The input terminals of the decoder 51 and the pseudo PCM signal generator 52 are connected to the transmission line 15. The output terminals of the decoder 51 and the pseudo PCM signal generator 52 are connected to the operation mode change switch 53. The operation mode change switch 53 is connected to the input terminal of the bit pattern adder 58. A control terminal of the operation mode change switch 53 is connected to the output terminal of the AND circuit 48 in the audio signal compressing and encoding device 18A. The output terminal of the bit pattern adder 58 is connected to the transit switch 13.

It should be noted that stations such as ordinary telephone sets other than digital-type stations are also connected to the transit switch 13.

In the digital audio signal transmitting apparatus 12A, the signaling bit lines SR1 and SS1 are assigned to receiving and sending respectively. One-bit signals (signaling bits) on the signaling bit lines SR1 and SS1 are "1" during speech or communication. The one-bit signals (the signaling bits) on the signaling bit lines SR1 and SS1 are "0" in the absence of speech or communication. The one-bit signal on the signaling bit line SR1 is generated by and transmitted from another exchange (not shown). The one-bit signal on the signaling bit line SS1 is generated by the transit switch 13. An interface (not shown) including a multiplexer and a demultiplexer is provided between the transmission line 11 and the digital audio signal transmitting apparatus 12A. The interface demultiplexes an incoming signal from the transmission line 11 into a first signal applied to the audio signal decoding device 16A and a one-bit signal applied to the signaling bit line SR1. The interface multiplexes the output signal of the operation mode change switch 33 and a one-bit signal on the signaling bit line SS1 into an outgoing signal applied to the transmission line 11.

In the digital audio signal transmitting apparatus 14A, the signaling bit lines SR2 and SS2 are assigned to receiving and sending respectively. One-bit signals (signaling bits) on the signaling bit lines SR2 and SS2 are "1" during speech or communication. The one-bit signals (the signaling bits) on the signaling bit lines SR2 and SS2 are "0" in the absence of speech or communication. The one-bit signal on the signaling bit line SR2 is generated by and transmitted from another exchange (not shown). The one-bit signal on the signaling bit line SS2 is generated by the transit switch 13. An interface (not shown) including a multiplexer and a demultiplexer is provided between the transmission line 15 and the digital audio signal transmitting apparatus 14A. The interface demultiplexes an incoming signal from the transmission line 15 into a first signal applied to the audio signal decoding device 19A and a one-bit signal applied to the signaling bit line SR2. The interface multiplexes the output signal of the operation mode change switch 43 and a one-bit signal on the signaling bit line SS2 into an outgoing signal applied to the transmission line 15.

The digital network system of FIG. 6 operates as follows. Operation of the audio signal decoding device 16A and operation of the audio signal decoding device 19A are similar to each other. Thus, only the operation of the audio signal decoding device 16A will be described in detail. The decoder 21 and the pseudo PCM signal generator 22 in the audio signal decoding device 16A receive an input audio signal from the transmission line 11. When the input audio signal agrees with a digital audio signal of a given code, the decoder 21 converts the digital audio signal of the given code back into an original PCM audio signal (a true PCM audio signal) through a decoding process. The decoder 21 outputs the true PCM audio signal to the operation mode change switch 23. On the other hand, the pseudo PCM signal generator 22 adds meaningless data to the digital audio signal of the given code and thereby converts the digital audio signal of the given code into a pseudo PCM signal without executing an effective decoding process. Specifically, the pseudo PCM signal generator 22 places bits of the digital audio signal of the given code in predetermined bit positions in the PCM signal format respectively, and places fixed-value bits in other bit positions in the PCM signal format. The pseudo PCM signal generator 22 outputs the pseudo PCM signal to the operation mode change switch 23. The operation mode change switch 23 selects one of the true PCM audio signal and the pseudo PCM signal, and transmits the selected signal to the bit pattern adder 28. The bit pattern adder 28 interposes or adds bits of a given pattern into the digital signal selected by the operation mode change switch 23. The bit pattern adder 28 outputs the resultant digital signal to the transit switch 13. Accordingly, a digital signal applied to the transit switch 13, which originates from sender audio information (sender speech information) generated by a digital-type station, contains the given-pattern bits. On the other hand, a digital signal applied to the transit switch 13, which originates from sender audio information (sender speech information) generated by an ordinary telephone set, does not contain the given-pattern bits.

The transit switch 13 executes a switching process, and thereby transmits the digital signal from the audio signal decoding device 16A to a destination (a communication opposite party).

Operation of the audio signal compressing and encoding device 17A and operation of the audio signal compressing and encoding device 18A are similar to each other. Thus, only the operation of the audio signal compressing and decoding device 17A will be described in detail. The encoder 31, the signal extractor 32, and the bit pattern detector 37 in the audio signal compressing and encoding device 17A receive a digital signal from the transit switch 13. The encoder 31 converts the received digital signal into a corresponding digital signal of the given code through compressing and encoding processes. Operation of the encoder 31 is inverse with respect to operation of the decoder 21 in the audio signal decoding device 16A. The encoder 31 outputs the digital signal of the given code to the operation mode change switch 33. The signal extractor 32 deletes a part of the received digital signal and thereby converts the received digital signal into a digital audio signal of the given code without executing an effective encoding process. Operation of the signal extractor 32 is inverse with respect to operation of the pseudo PCM signal generator 22 in the audio signal decoding device 16A. The signal extractor 32 outputs the digital audio signal of the given code to the operation mode change switch 33. The operation mode change switch 33 selects one of the output signals of the encoder 31 and the signal extractor 32, and transmits the selected signal to the transmission line 11.

The bit pattern detector 37 in the audio signal compressing and encoding device 17A decides whether or not the received digital signal contains the given-pattern bits, and generates a signal representing the result of the decision. Specifically, the bit pattern detector 37 outputs a signal of "1" when the received digital signal contains the given-pattern bits. The bit pattern detector 37 outputs a signal of "0" when the received digital signal does not contain the given-pattern bits. The output signal of the bit pattern detector 37 is applied to the AND circuit 38. In addition, one-bit signals on the signaling bit lines SR1 and SS1 are applied to the AND circuit 38. The AND circuit 38 executes logic AND operation among the output signal of the bit pattern detector 37 and the one-bit signals on the signaling bit lines SR1 and SS1. The output signal of the AND circuit 38 is fed to the operation mode change switches 23 and 33 as a switch control signal. The operation mode change switch 23 selects one of the output signals of the decoder 21 and the pseudo PCM signal generator 22 in response to the switch control signal. The operation mode change switch 33 selects one of the output signals of the encoder 31 and the signal extractor 32 in response to the switch control signal. When all of the output signal of the bit pattern detector 37 and the one-bit signals on the signaling bit lines SR1 and SS1 are "1", the operation mode change switch 23 selects the output signal of the pseudo PCM signal generator 22 and the operation mode change switch 33 selects the output signal of the signal extractor 32. When at least one of the output signal of the bit pattern detector 37 and the one-bit signals on the signaling bit lines SR1 and SS1 is "0", the operation mode change switch 23 selects the output signal of the decoder 21 and the operation mode change switch 33 selects the output signal of the encoder 31.

In the case where the communication opposite party agrees with a digital-type station, transmitted audio information is enabled to bypass the decoder 21 and the encoder 31 in the digital audio signal transmitting apparatus 12A. On the other hand, in the case where the communication opposite party agrees with an ordinary telephone set, transmitted audio information is enabled to travel through the decoder 21 and the encoder 31. Thus, in this case, the decoder 21 and the encoder 31 are actually used and operated.

Operation of the digital network system of FIG. 6 will be further described. In the case where the digital audio signal transmitting apparatus 12A is connected via the transit switch 13 to an ordinary telephone set or is in an unconnected state, a digital signal received by the audio signal compressing and encoding device 17A from the transit switch 13 does not contain the given-pattern bits. Accordingly, the output signal of the bit pattern detector 37 is "0", and hence the operation mode change switch 23 selects the output signal of the decoder 21 while the operation mode change switch 33 selects the output signal of the encoder 31. In this case, a digital audio signal of the given code which is fed from the transmission line 11 is decoded back into an original PCM audio signal (a true PCM audio signal) by the decoder 21. The true PCM audio signal is transmitted from the decoder 21 to the bit pattern adder 28 via the operation mode change switch 23. The bit pattern adder 28 interposes or adds the bit pattern signal in the true PCM audio signal. The bit pattern adder 28 outputs the resultant digital signal to the transit switch 13. Specifically, the bit pattern adder 28 places bits of the bit pattern signal in predetermined bit positions in the true PCM audio signal respectively. In more detail, the bit pattern adder 28 replaces the predetermined-position bits of the true PCM audio signal by the bits of the bit pattern signal respectively. Preferably, the predetermined bit positions correspond to a given period. The predetermined bit positions and the related period are preferably chosen so that the interposition of the pattern signal in the true PCM audio signal will not adversely affect the quality of audio information represented by the resultant digital signal. FIG. 4 shows one example of the manner of the interposition of the bit pattern signal in the true PCM audio signal. In FIG. 4, bits of the bit pattern signal are placed in the lowest bit positions (the LSB positions) of 8-bit data blocks spaced by equal intervals, respectively. On the other hand, a PCM audio signal fed from the transit switch 13 is encoded into a corresponding digital audio signal of the given code by the encoder 31. The digital audio signal of the given code is transmitted from the encoder 31 to the transmission line 11 via the operation mode change switch 33.

A description will now be given of the case where two digital-type stations start to be connected via the transit switch 13. It is now assumed that the digital audio signal transmitting apparatus 12A relates to a calling party while the digital audio signal transmitting apparatus 14A relates to a called party. An end exchange (not shown) directly connected to the calling party changes a sending signaling bit from "0" to "1", so that a one-bit signal on the signaling bit line SR1 also changes from "0" to "1". In response to this change in the one-bit signal on the signaling bit line SR1, the transit switch 13 prepares for receiving dial information. A digital audio signal of the given code which indicates non-speech dial information (for example, MF tone dial information) is transmitted to the audio signal decoding device 16A from the transmission line 11. The digital audio signal of the given code is decoded back into an original PCM audio signal by the decoder 21 before being transmitted to the transit switch 13 via the operation mode change switch 23 and the bit pattern adder 28. Thus, the transit switch 13 executes a connecting process or a switching process in response to the PCM dial signal. The transit switch 13 establishes only one-way connection from the called party to the calling party via a speech path "B" upon the reception of a first portion of the dial information from the calling party. In addition, the transit switch 13 changes a one-bit signal on the signaling bit line SS2 from "0" to "1" to start an end exchange (not shown) directly connected to the called party. A digital signal transmitted from the audio signal decoding device 19A to the audio signal compressing and encoding device 17A via the speech path "B" in the transit switch 13 contains the given-pattern bits as a result of operation of the bit pattern adder 58. Therefore, the bit pattern detector 37 detects the bit pattern signal in the received signal, and the output signal of the bit pattern detector 37 changes from "0" to "1". At this state, a one-bit signal on the signaling bit line SS1 remains "0", and hence the output signal of the AND circuit 38 remains "0". Thus, the operation mode selection switch 23 remains selecting the output signal of the decoder 21 while the operation mode change switch 33 remains selecting the output signal of the encoder 31. Accordingly, the true PCM audio signal representing the remainder portion of the dial information is transmitted from the decoder 21 to the transit switch 13 via the operation mode change switch 23 and the bit pattern adder 28. Generally, the transit switch 13 can accurately recover dial information from a PCM audio signal. Thus, the remainder portion of the dial information is received and recovered by the transit switch 13. After the remainder of the dial information is recovered by the transit switch 13 and then the whole of the dial information is transmitted to the called party from the transit switch 13, the transit switch 13 establishes one-way connection from the calling party to the called party via a speech path "A" in addition to one-way connection from the called party to the calling party via the speech path "B". A digital signal transmitted from the audio signal decoding device 16A to the audio signal compressing and encoding device 18A via the speech path "A" in the transit switch 13 contains the given-pattern bits as a result of operation of the bit pattern adder 28. Therefore, the bit pattern detector 47 detects the bit pattern signal in the received signal, and the output signal of the bit pattern detector 47 changes from "0" to "1". At this state, a one-bit signal on the signaling bit line SR2 remains "0", and hence the output signal of the AND circuit 48 remains "0". Thus, the operation mode selection switch 53 remains selecting the output signal of the decoder 51 while the operation mode change switch 43 remains selecting the output signal of the encoder 41. Subsequently, the end exchange directly connected to the called party detects an answer from the called party, and changes a related signaling bit from "0" to "1" which is directed from the called party to the calling party. Therefore, the one-bit signal on the receiving signaling bit line SR2 changes from "0" to "1". In response to this change in the one-bit signal on the receiving signaling bit line SR2, the transit switch 13 changes the one-bit signal on the transmitting signaling bit line, SS1 from "0" to "1" to inform the end exchange, directly connected to the calling party, of the answer from the called party.

When the one-bit signal on the receiving signaling bit line SR2 changes from "0" to "1", the output signal of the AND circuit 48 changes from "0" to "1" so that the operation mode change switch 43 selects the output signal of the signal extractor 42 instead of the output signal of the encoder 41 while the operation mode change switch 53 selects the output signal of the pseudo PCM signal generator 52 instead of the output signal of the decoder 51. The output signal of the AND circuit 38 changes from "0" to "1" in response to the change of the one-bit signal on the signaling bit line SS1 from "0" to "1". Therefore, the operation mode change switch 33 selects the output signal of the signal extractor 32 instead of the output signal of the encoder 31 while the operation mode change switch 23 selects the output signal of the pseudo PCM signal generator 22 instead of the output signal of the decoder 21. In this way, two-way connection between the calling party and the called party is established, and transmitted audio information is enabled to bypass the decoders 21 and 51 and the encoders 31 and 41 in the digital audio signal transmitting apparatuses 12A and 14A.

During two-way connection between the calling party and the called party, the digital audio signal transmitting apparatus 12A operates as follows. A digital audio signal of the given code which is fed from the transmission line 11 is converted into a pseudo PCM signal by the pseudo PCM signal generator 22. Specifically, the pseudo PCM signal generator 22 places bits of the digital audio signal of the given code in predetermined bit positions in the PCM signal format respectively, and places fixed-value bits in other bit positions in the PCM signal format. To generate the pseudo PCM signal, the pseudo PCM signal generator 22 may place bits of the digital audio signal of the given code in predetermined bit positions in a fixed meaningless background PCM signal respectively. The pseudo PCM signal is fed to the bit pattern adder 28 via the operation mode change switch 23. The bit pattern adder 28 interposes or adds the bit pattern signal in the pseudo PCM signal. The bit pattern adder 28 outputs the resultant digital signal to the transit switch 13. Specifically, the bit pattern adder 28 places bits of the bit pattern signal in predetermined bit positions in the pseudo PCM signal respectively. In more detail, the bit pattern adder 28 replaces the predetermined-position bits of the pseudo PCM signal by the bits of the bit pattern signal respectively. Preferably, the predetermined bit positions correspond to a given period. The number of given-pattern bits interposed in the pseudo PCM signal during a unit time is preferably predetermined in accordance with the bit rate of a digital audio signal of the given code. FIG. 5 shows one example of the manner of combining the digital audio signal of the given code and the background PCM signal and the manner of the interposition of the bit pattern signal in the pseudo PCM signal. In FIG. 5, bits of the digital audio signal of the given code (having a bit rate of 8 kbps) are placed in the second lowest bit positions in successive 8-bit data blocks of the background PCM signal (having a bit rate of 64 kbps) respectively. Further, bits of the bit pattern signal are placed in the lowest bit positions (the LSB positions) of 8-bit data blocks spaced by equal intervals, respectively. On the other hand, the signal extractor 32 deletes a part of a received digital signal applied from the transit switch 13, and thereby converts the received digital signal into a digital audio signal of the given code without executing an effective encoding process. In other words, the device 32 extracts the digital audio signal of the given code from the received digital signal. The digital audio signal of the given code is transmitted from the signal extractor 32 to the transmission line 11 via the operation mode change switch 33.

During two-way connection between the calling party and the called party, operation of the digital audio signal transmitting apparatus 14A is similar to the previously-mentioned operation of the digital audio signal transmitting apparatus 12A.

When communication between the calling party and the called party ends, all the one-bit signals on the signaling bit lines SR1, SS1, SR2, and SS2 are changed from "1" to "0". In addition, the transit switch 13 breaks the speech paths "A" and "B". As a result, the calling party and the called party are disconnected from each other. The given-pattern bits disappear from the digital signal received by the bit pattern detector 37. Therefore, the operation mode change switch 23 selects the output signal of the decoder 21 instead of the output signal of the pseudo PCM signal while the operation mode change switch 33 selects the output signal of the encoder 31 instead of the output signal of the signal extractor 32. These conditions of the operation mode change switches 23 and 33 correspond to a stand-by state of the digital audio signal transmitting apparatus 12A. Similarly, the digital audio signal transmitting apparatus 14A falls into a stand-by state.

In the case where the one-bit signals on the signaling bit lines SR1, SS1, SR2, and SS2 are also used for another purpose, it is preferable to provide each of the one-bit signals with a given protective time before the application thereof to the AND circuit 38 or 48.

What is claimed is:

1. A digital audio signal transmitting apparatus comprising:

a) an audio signal decoding device which includes:

a1) a decoder for decoding a digital audio signal of a given code into an original digital audio signal;

a2) a pseudo PCM signal generator for interposing the digital audio signal of the given code in a predetermined background PCM signal;

a3) a first operation mode change switch for selecting an output signal of the decoder or an output signal of the pseudo PCM signal generator in response to an operation mode change signal;

a4) a first bit pattern generator for generating a first bit pattern signal including bits in a first determined pattern;

a5) a second bit pattern generator for generating a second bit pattern signal including bits in a second predetermined pattern different from the first predetermined pattern;

a6) a bit pattern change switch for selecting the first bit pattern signal or the second bit pattern signal in response to first and second bit pattern change signals;

a7) a bit pattern interposer for interposing a bit pattern signal selected by the bit pattern change switch in a signal selected by the first operation mode change switch; and b) an audio signal compressing and encoding device which includes:

b1) an encoder for compressing and encoding an incoming digital audio signal into another digital audio signal of the given code;

b2) a signal extractor for extracting a digital audio signal of the given code from the incoming digital audio signal;

b3) a first bit pattern detector for detecting whether or not the incoming digital audio signal contains the first bit pattern signal, and for generating the first bit pattern change signal in response to a result of said detecting;

b4) a second bit pattern detector for detecting whether or not the incoming digital audio signal contains the second bit pattern signal, and for generating a second pattern change signal and an operation mode change signal in response to a result of said detecting;

b5) a second operation mode change switch for selecting an output signal of the encoder or an output signal of the signal extractor in response to the operation mode change signal.

2. A digital audio signal transmitting apparatus comprising:

a) an audio signal decoding device which includes:

a1) a decoder for decoding a digital audio signal of a given code into an original digital audio signal;

a2) a pseudo PCM signal generator for interposing the digital audio signal of the given code in a predetermined background PCM signal;

a3) a first operation mode change switch for selecting one of an output signal of the decoder and an output signal of the pseudo PCM signal generator in response to an operation mode change signal;

a4) a bit pattern adder for interposing a bit pattern signal in a signal selected by the first operation mode change switch, the bit pattern signal including bits in a predetermined pattern; and b) an audio signal compressing and encoding device which includes;

b1) an encoder for compressing and encoding an incoming digital audio signal into another digital audio signal of the given code;

b2) a signal extractor for extracting a digital audio signal of the given code from the incoming digital audio signal;

b3) a bit pattern detector for detecting whether or not the incoming digital audio signal contains the bit pattern signal, and for generating a signal in response to a result of said detecting;

b4) a logic operation circuit for executing a given logic operation from the output signal of the bit pattern detector, a sending signal, and a receiving signal, the sending signal and the receiving signal represent whether or not communication is being currently executed, and for generating the operation mode change signal in response to the output signal of the bit pattern detector, the sending signal, and the receiving signal;

b5) a second operation mode change switch for selecting one of an output signal of the encoder and an output signal of the signal extractor in response to the operation mode change signal.

3. The digital audio signal transmitting apparatus of claim 2, wherein the logic operation circuit comprises an AND circuit.

4. An apparatus connected to a transit switch and operating on an incoming digital audio signal sequentially representing dial information and audio information, comprising:

a decoder;

first means for continuously feeding an incoming digital audio signal to the decoder and transmitting an output signal of the decoder to the transit switch until the whole of the dial information represented by the output signal of the decoder is received by the transit switch; and second means for enabling the incoming digital audio signal to bypass the decoder and travel directly to the transit switch after the dial information is received by the transmit switch.

* * * * *